United States Patent
Gorzela

(10) Patent No.: US 7,730,409 B2
(45) Date of Patent: *Jun. 1, 2010

(54) METHOD AND SYSTEM FOR VISUALIZING WEBLOG SOCIAL NETWORK COMMUNITIES

(75) Inventor: Richard Gorzela, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/048,779

(22) Filed: Mar. 14, 2008

(65) Prior Publication Data

US 2008/0163068 A1    Jul. 3, 2008

Related U.S. Application Data

(63) Continuation of application No. 11/138,568, filed on May 26, 2005, now Pat. No. 7,373,606.

(51) Int. Cl.
    *G06F 3/00* (2006.01)
(52) U.S. Cl. ............... 715/738; 707/E17.093; 707/E17.116
(58) Field of Classification Search ............... 715/738
    See application file for complete search history.

(56) References Cited

U.S. PATENT DOCUMENTS

| | | | |
|---|---|---|---|
| 2006/0004691 A1* | 1/2006 | Sifry | 707/1 |
| 2006/0230061 A1* | 10/2006 | Sample et al. | 707/103 R |
| 2006/0284744 A1* | 12/2006 | Shotland | 341/50 |

* cited by examiner

*Primary Examiner*—Weilun Lo
*Assistant Examiner*—Kim-Lynn Dam
(74) *Attorney, Agent, or Firm*—David A. Dagg

(57) ABSTRACT

A system for providing a visual representation of electronic, on-line journals, such as those generally referred to as "Weblogs" or "Blogs", that uses a treemap display object in a graphical user interface to represent social networking characteristics discovered in, and aggregated from a set of on-line journals. The generated display object includes on-line journal representations shown within the social network communities to which they belong. This visual organization is provided through a treemap representation, in which an enclosing region for a set of journals is broken up into sub-regions corresponding to social network communities. Representations of individual on-line journals are provided as inner regions within the sub-regions for the communities. The enclosing region, sub-regions and inner regions may be rectangular, or any other specific geometric shape as appropriate for a given application. The relative size of an inner region representing a specific journal may be determined based on how strongly related that journal is to the other members of the community, or on how active that journal is in terms of reads or writes, or based on some other criteria.

12 Claims, 4 Drawing Sheets

METHOD AND SYSTEM FOR VISUALIZING WEBLOG SOCIAL NETWORK COMMUNITIES

CROSS-REFERENCE TO RELATED APPLICATIONS

The present application is a Continuation application under 35 U.S.C. 120 of commonly owned prior application Ser. No. 11/138,568, filed May 26, 2005 now U.S. Pat. No. 7,373,606 in the name of Richard Gorzela, now allowed.

FIELD OF THE INVENTION

The present invention relates generally to user interfaces, and more specifically to a user interface for visually representing social network communities within sets of on-line electronic journals.

BACKGROUND OF THE INVENTION

As it is generally known, the World Wide Web is a major service provided over the Internet, using Web server computer systems that store and disseminate Web pages. Web pages are HTML (HyperText Mark-up Language) documents containing text, graphics, animations and videos, and are accessible via Web browser application programs such as Internet Explorer®, Netscape®, Safari, Opera and Firefox. The browser program renders Web pages it obtains via HTTP (HyperText Transport Protocol) on a display screen. A collection of Web pages makes up a Web site. Weblogs, or Blogs, are an increasingly popular type of Web site. Weblogs are an example of personalized, on-line electronic journals. Weblogs typically contain dated entries, usually in reverse chronological order, about a particular topic or individual. Weblogs are associated with and written by one or more contributors, sometimes referred to as Bloggers, and referred to herein as authors. Entries (also referred to herein as "postings" or "posts") contain content defined by a Weblog author, and commentary by other users about the entry, or links to such commentary. A set of links to other Weblogs, sometimes referred to as a Blogroll, and a search facility are often also included in a Weblog.

The popularity of Weblogs has increased since development applications such as Pitas, Blogger and GrokSoup were released. Template-based software has made it increasingly easy to add entries to a Weblog, while hosting services have made it easy to create and maintain a Weblog. Various implementations of Weblogs can be found on the Web. Examples of Web sites currently containing Weblog implementations include www.blogger.com, www.userland.com, www.socialtext.com.

Though postings in Weblogs are typically created by one, or a small group of authors, many Weblog authors and other users also subscribe to, read, and enter comments to postings in multiple Weblogs. For example, Weblog subscriptions are often provided using the RSS (Rich Site Summary) format for syndicating Web content. Additionally, Weblog users often enter links to Weblog postings in Weblogs other than the one on which the postings were originally made. Such links are sometimes referred to as "trackbacks". Trackbacks related to a given posting are often made available to readers of the original posting through the Weblog user interface. As noted above, Weblog authors also often maintain a publicly available list of other Weblogs they find interesting, referred to as a Blogroll. These and other features relating authors and other users through different Weblogs allow Weblog users to form social networks, some of which have become popular and influential.

In existing systems, it is difficult for a user to identify social networks defined through Weblogs, or to identify influential Weblogs within such social networks. This problem results in part from the large and growing number of Weblogs, and also from the limited features of tools that are currently available. The most common tools today provide Weblog listings identifying Weblogs 1) with the most recent posts, 2) with the most comments over a given time period, or 3) with the most hits over a given time period. Some Weblog implementations also list newly created Weblogs. Additionally, users can performs searches via existing search tools, such as Google™ and the like, to find Weblogs or Weblog posts containing specified keywords of interests. However, none of these tools help users identify social networks defined by Weblogs, or influential Weblogs within such networks.

Some existing systems have attempted to provide visualizations of Weblogs, in some cases using specific approaches based on what are known as "treemap" visual constructs. However, existing Weblog visualization systems do not address identification or visualization of social networks created by groups of Weblogs. Instead, they focus on characteristics such as the relative size of Weblogs or Weblog posts, the number of comments to a post, or the recentness of a post. For example, in one existing system, top level rectangles within a display object are used to represent each Weblog, with the size of each rectangle determined by the number of posts in the corresponding Weblog. Inner rectangles are used to represent individual posts, and each have a size determined by the length of the corresponding post. Another existing system uses inner rectangles to represent posts, with the inner rectangle size determined by the number of related comments. None of these systems includes the features needed to provide a user with a convenient and rich user interface display object or objects that represents the social networks within a set of Weblogs, or the influence of specific Weblogs on such social networks.

For the above reasons and others it would therefore be desirable to have a new system for representing a set of on-line journals that enables users to quickly visualize social network communities within the journal set, as well as the significance of individual journals within the communities.

SUMMARY OF THE INVENTION

To address the above described and other shortcomings of prior approaches, a new method and system are disclosed for providing a visual representation of electronic, on-line journals, such as those generally referred to as "Weblogs" or "Blogs". The disclosed system uses a treemap display object in a graphical user interface to represent social networks discovered in, and aggregated from a set of on-line journals.

The disclosed system operates to detect and aggregate information describing social network relationships within a set of on-line journals. These relationships define social network communities made up of on-line journals. The disclosed system generates one or more display objects in which on-line journal representations are shown within the social network communities to which they belong. This visual organization is provided through a treemap representation, in which an enclosing region for the complete set of journals is broken up into sub-regions corresponding to the social network communities. Representations of individual on-line journals are provided as inner regions within the sub-regions for the communities. The enclosing region, sub-regions and inner regions may, for example, be rectangular, or any other specific geometric shape as appropriate for a given application.

Various specific social network relationships may be used to define the social network communities of on-line journals that are shown in the display sub-regions. For example, each journal typically has one or more authors associated with it. In one embodiment, a social network relationship may be present between two journals when an author of a first journal posts a comment to a second journal. Similarly, on-line journals often include lists of links, often based on Uniform Resource Locators (URLs), to other on-line journals. A social network relationship may be present between two journals when such a list in a first journal includes a link to a second journal. Other specific types of relationships between on-line journals may be used alternatively or additionally to define social network relationships. Moreover, thresholds may be used to restrict social network community membership to those journals that have sufficiently "strong" relationships to other journals in the community.

The relative size of an inner region representing a specific journal may be determined based on how strongly related that journal is to the other members of the community, or on how active that journal is in terms of reads or writes, or based on some other criteria.

Thus there is disclosed a new system for representing a set of on-line journals that enables users to quickly visualize social network communities within the set, as well as the significance of individual journals within the communities.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
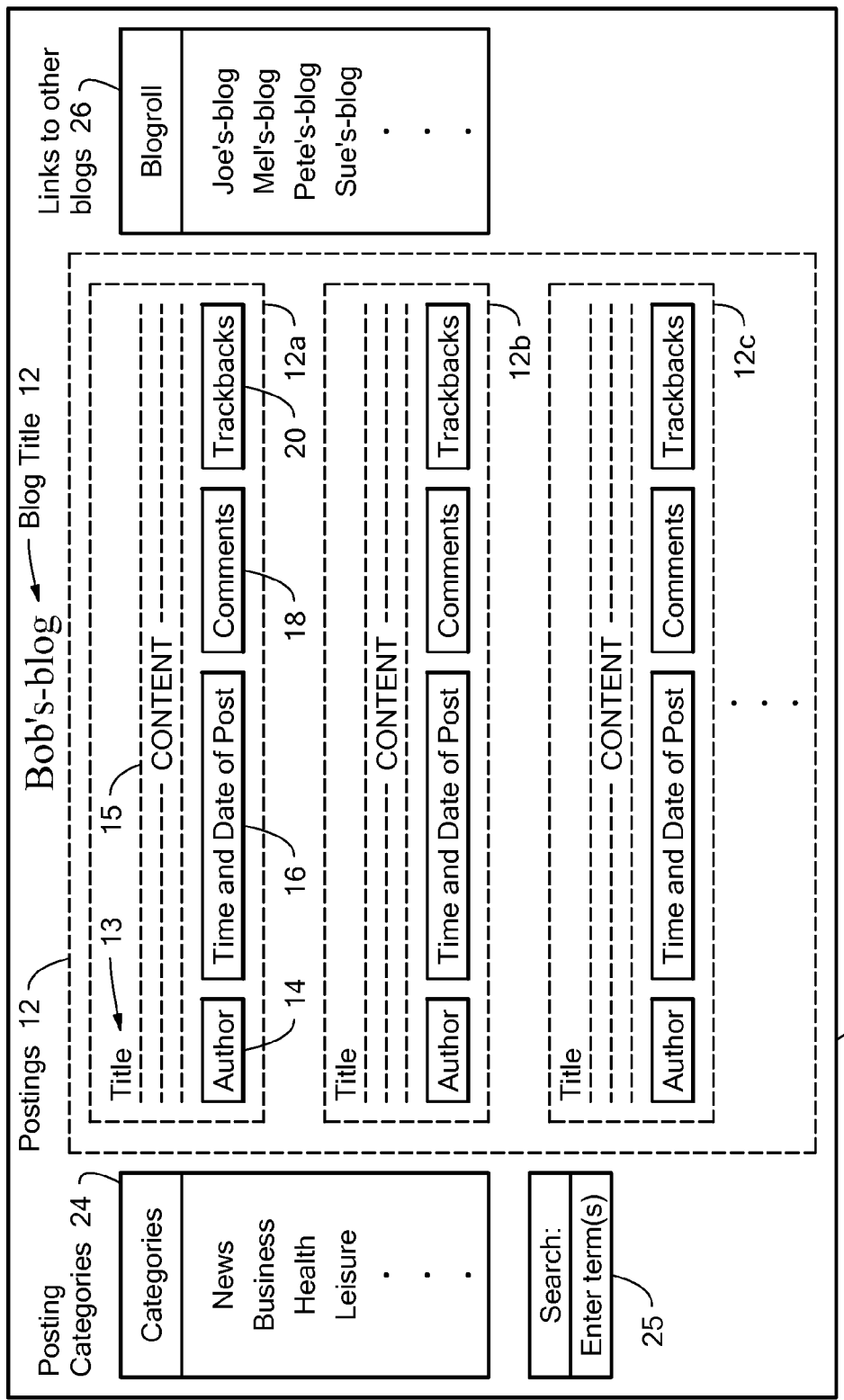
FIG. 1 shows a simplified screen shot illustrating an example of a Weblog user interface.

FIG. 1 shows a Weblog user interface 10, which is an example of a graphical user interface provided to an electronic, on-line journal. For example, the interface 10 may be a Web page rendered to a user through a Web browser application program or the like. The interface 10 includes a blog title 12, in this case "Bob's-blog". A number of properties 12 are shown for purposes of illustration including a first posting 12a, a second posting 12b, a third posting 12c, and so on. The postings 12 are listed in reverse chronological order. As indicated in the posting 12a, each posting includes an author indication 14, which may be a button through which a link may be accessed to information regarding the author of that posting. A time and date of post indication 16 is provided to display the time and date that the posting was made. A comments button 16 provides the user with a link to comments on the posting. The user can click on the comments button 16 to access previous comments regarding the posting, or to enter their own comment on the posting. A trackbacks button 20 enables the user to access a listing of other Weblogs that include links back to the posting. The title 13 of the posting is entered by the posting's author, and content 15 of each posting may consist of text, graphics, or any other type of content that may be provided over the Web.

The interface 10 is further shown including a postings category interface 24 that allows a user to click on a category from a list to access those postings related to that category. A search interface 25 allows a user to enter a search string in order to access postings containing that string. And a blogroll 26 includes a list of links to other Weblogs selected by the author of the Weblog for the interface 10, such that those other Weblogs can be accessed by clicking on the corresponding link.

Those skilled in the art will recognize that the specific layout and contents of the Weblog user interface 10 in FIG. 1 are given solely for purposes of explanation, and that many other alternative configurations, layouts, and contents are possible for a specific Weblog. Accordingly, the present invention is not to be considered limited to use with only those Weblogs that match the user interface 10, but rather may be used to visually represent social networks within groups of Weblogs including any specific type or kind of Weblog.

Figure 2:
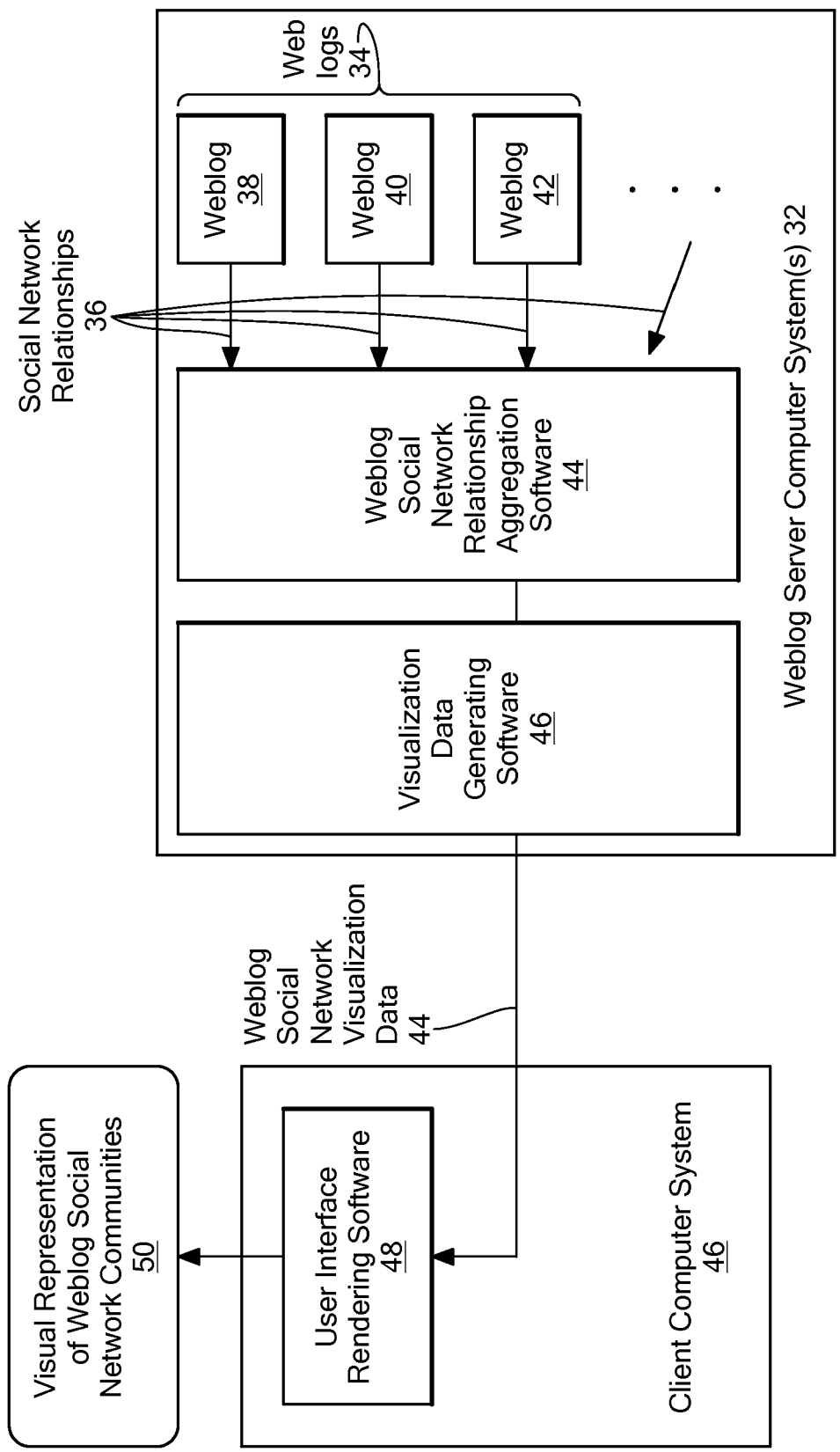
FIG. 2 is a block diagram showing computer systems and software components in an illustrative embodiment of the disclosed system.

FIG. 2 is a block diagram showing computer systems and software components in an illustrative embodiment of the disclosed system. In the embodiment of FIG. 2, a number of Weblog server computer systems 32 are hosts to a number of Weblogs 34, shown for purposes of illustration including Weblog 38, Weblog 40, Weblog 42, etc. The Weblogs 34 may include any specific type or kind of Weblog. For example, each of the Weblogs 34 may be generated and maintained using a common Weblog tool or application, and centrally managed within a business organization. Alternatively, the Weblogs 34 may include diverse types of Weblogs, and be generated and maintained using a variety of Weblog tools or applications.

Weblog social network relationship aggregation software 44 operates to detect and aggregate the social network relationships 36 between Weblogs in the Weblogs 34. The access by the aggregation software 44 to the Weblogs 34 may be performed through one or more application programming interfaces (APIs) provided by the Weblogs 34.

For example, the aggregation software 44 may operate to detect when a user that enters a comment to a post in Weblog 38 is also an author of the Weblog 40. In a configuration or embodiment in which such actions define a social network relationship between Weblog 38 and 40, that relationship would be recorded in a data structure of social network relationships across all the Weblogs 34 for later access. Alternatively, or in addition, the disclosed system may be embodied such that a social network relationship between Weblog 38 and Weblog 40 occurs when a user comments on posts in both Weblog 38 and Weblog 40. Another type of possible social network relationship between blogs may potentially occur when a trackback link has been entered into a first Weblog, such as Weblog 38, indicating a posting in a second Weblog, such as Weblog 40. This also may result in indication of a social network relationship between Weblog 38 and Weblog 4, to be stored in the above mentioned data structure of social network relationships across the Weblogs 34. Another example of a social network relationship might be the inclusion in a blogroll for a first one of the Weblogs 34 of a link to a second one of the Weblogs 34. Thus if a blogroll for Weblog 38 included a link to Weblog 40, this might be considered to form a social network relationship between Weblog 38 and Weblog 40, and similarly result in an indication of the relationship being stored in the social network relationship data structure. Alternatively, or in addition, social network relationships between blogs may potentially result from a user reading a first Weblog and a second Weblog.

The above are only a few examples of possible social network relationships between Weblogs that may be used in the disclosed system, and those skilled in the art will recognize that other specific kinds of social network relationships between Weblogs may be used in the alternative or additionally for other specific embodiments or configurations.

In addition to any data structures used to aggregate social network relationships between Weblogs, various other data structures may be used within and/or by the aggregation software 44 to identify and/or associate Weblogs, Weblog authors, and users making comments to Weblog postings. For example, a data structure mapping Weblogs to their author's user names might be maintained to identify social network relationships formed when a Weblog author enters a comment to a post in another Weblog. In one embodiment, data generated during operation of the disclosed system may be persisted across sessions.

Social network relationship data aggregated from the Weblogs 34 is processed by visualization data generating software 46 to generate a treemap representation of the social networks defined in the Weblogs 34. An example of the treemap representation generated by the software 46 is illustrated and described by the user interface display shown in FIG. 3. The software 46 operates to provide Weblog social network visualization data 44 to the user interface rendering software 48 in the client computer system 46. The user interface rendering software 48 may include a Web browser application program, and the data 44 may include or consist of HTML code provided in one or more documents, and conveyed between the server system(s) 32 and the client computer system 46 using HTTP. The user interface rendering software 48 operates to provide the visual representation of the Weblog social network communities 50, as illustrated in FIG. 3.

In an alternative embodiment, some or all of the functionality of the visualization data generating software 46 and/or Weblog social networking software 44 may be provided on the client computer system 46. Moreover, while the user interface generating software 48 is described above as including a Web browser application program, a "rich client" application program other than a Web browser may be used in whole or in part in addition to the Web browser, or as an alternative to the Web browser, to generate the visual representation 50, and/or to provide further functionality relating to the visual representation 50.

As shown in FIG. 2, an illustrative embodiment of the disclosed system operates using a number of software components executing on at least one client computer system, shown for purposes of illustration as the client computer system 46, and at least one server computer system, shown for purposes of illustration as Weblog server computer system(s) 32. The client computer system 46 and Weblog server computer system 32 may, for example, each include at least one processor, program storage, such as memory, for storing program code executable on the processor, and one or more input/output devices and/or interfaces, such as data communication and/or peripheral devices and/or interfaces. The client computer system 46 and Weblog server computer system 32 are communicably connected by a data communication system, such as a Local Area Network (LAN), the Internet, or the like. The client computer system 46 and Weblog server computer system(s) 32 may further include appropriate operating system software.

Figure 3:
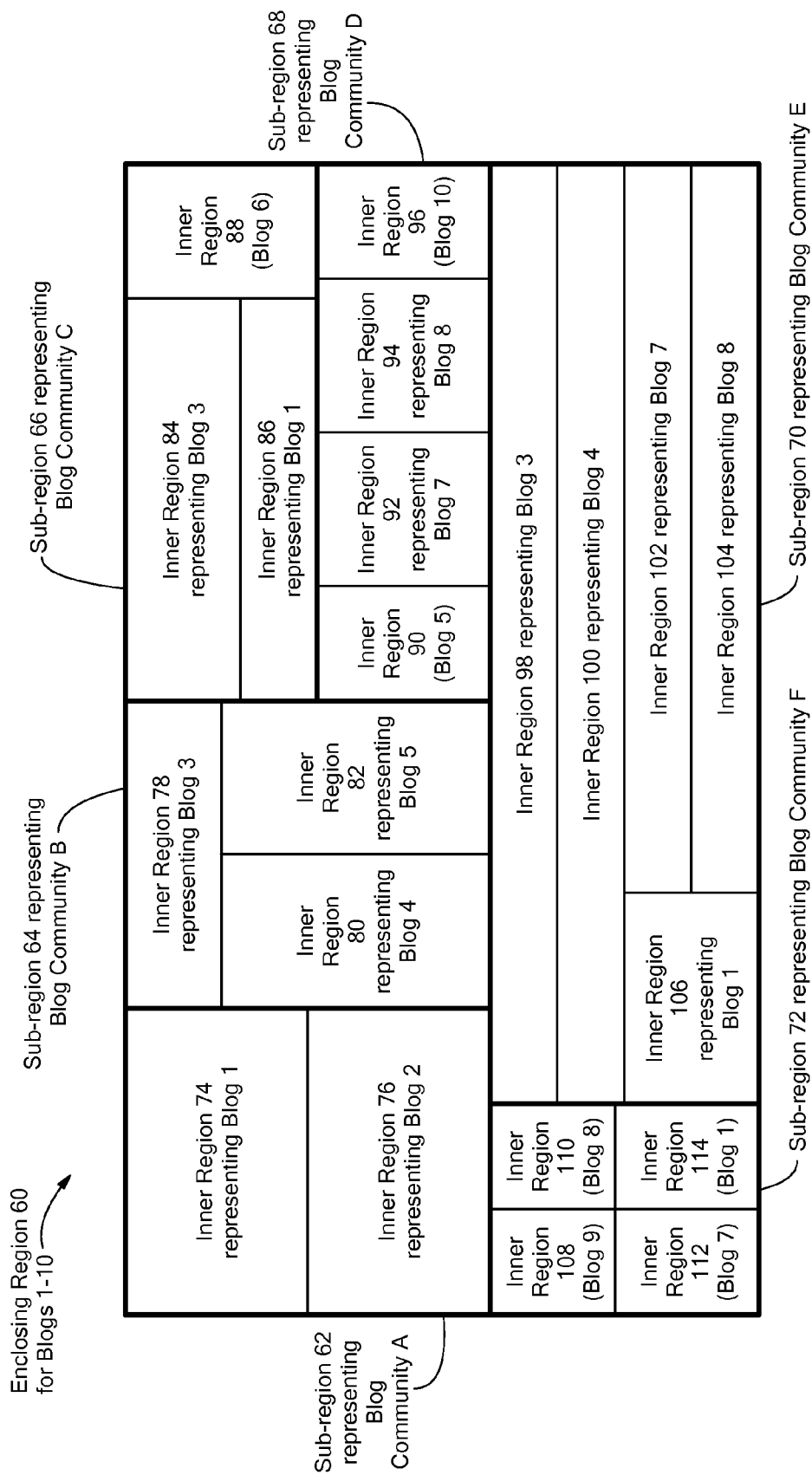
FIG. 3 is an example of a user interface display representing social network relationships between a number of Weblogs in an illustrative embodiment of the disclosed system.

FIG. 3 is a portion of a screen shot showing an example of one or more display objects in a user interface a generated by an embodiment of the disclosed system, and representing the social network relationships within a set of Weblogs. For convenience, Weblogs are referred to as Blogs with reference to FIG. 3, and the set of Weblogs for which social network relationships are Blogs 1-10.

As shown in FIG. 3, an enclosing region 60 is a rectangle within which are contained a number of rectangular sub-regions, each corresponding to a social network within the Blogs 1-10, and that each in turn contain inner rectangles corresponding to blogs belonging to the their respective corresponding social network. Specifically, the enclosing region 60 includes a sub-region 62 representing blog social network community A, a sub-region 64 representing a blog social network community B, a sub-region 66 representing a blog social network community C, a sub-region 68 representing a blog social network community D, a sub-region 70 representing a blog social network community E, and a sub-region 72 representing a blog social network community E.

Each of the sub-regions shown in FIG. 3 contain a number of inner regions representing blogs that belong to the corresponding social network community. Accordingly, sub-region 62 includes inner region 74 representing blog 1 and inner region 76 representing blog 2, accordingly blog 1 and blog 2 belong to the social network blog community A represented by sub-region 62. Sub-region 64 includes inner region 78 representing blog 3, inner region 80 representing blog 4, and inner region 82 representing blog 5. Accordingly, blog 3, blog 4 and blog 5 belong to the social network blog community B represented by sub-region 64.

Sub-region 66 includes inner region 84 representing blog 3, inner region 86 representing blog 1, and inner region 88 representing blog 6. Accordingly, blog 1, blog 3 and blog 6 belong to the social network blog community C represented by sub-region 66.

Sub-region 68 includes inner region 90 representing blog 5, inner region 92 representing blog 7, inner region 94 representing blog 8, and inner region 96 representing blog 10. Blog 5, blog 7, blog 8 and blog 10 accordingly belong to the social network blog community D represented by sub-region 68.

Sub-region 70 includes inner region 106 representing blog 1, inner region 104 representing blog 8, inner region 102 representing blog 7, inner region 100 representing blog 4, and inner region 98 representing blog 3. Blog 1, blog 8, blog 7, blog 4 and blog 3 accordingly belong to the social network blog community E represented by sub-region 70.

Finally, sub-region 72 is shown including inner region 108 representing blog 9, inner region 110 representing blog 8, inner region 112 representing blog 7, and inner region 114 representing blog 1. Blog 1, blog 7, blog 8 and blog 9 are therefore members of social network blog community F represented by sub-region 72.

As discussed above, the disclosed system may be embodied to detect and aggregate various types of social network relationships between blogs, which are then used to determine the social network community memberships of each blog. Moreover, multiple social network relationships may sometimes be required for a blog to be considered a member of a social network community. For example, a blog may be considered a member of a social network community if there are at least one social network relationship between that blog and each other blog in that community. In another example, a blog may be considered a member of a social network community if there exist a number of social network relationships between that blog and each other blog in that community equal to or greater than some minimum threshold. Or, a blog could be considered a member of a social network community if there exist a number of social network relationships between that blog and all other blogs in that community that is equal to or greater than a minimum threshold. In another embodiment, a social network community could be further split into two or more sub-groups based on other criteria, such as subject matter. For example, a first sub-group of a social network community might consist of those blogs containing references to a first subject, and a second sub-group might consist of those blogs containing references to a second subject. If a given blog were to contain references to both subjects, it would be present in, and its representation displayed as part of, each sub-group.

The size of each sub-region and/or inner region in the display of FIG. 3 may be determined in various ways. For example, the size of an inner region may be determined based on, and accordingly represent, the number of social network relationships between the corresponding blog and other blogs in that social network blog community. In such an embodiment, a blog having a relatively larger number of social network relationships within a social network community would be represented by a relatively larger inner region than the inner region representing another blog in that community with a relatively lower number of such social network relationships. This approach provides the user with a way to quickly identify which blogs are most influential within a social network community, since those blogs would be represented by the relatively largest inner regions of the display. For example, the relatively larger inner region 100 with respect to inner region 102 would indicate that blog 4 has more social network relationships to other blogs within the blog community E than blog 7. Other characteristics or attributes may alternatively or additionally be used to determine inner region size, such as number of postings in a blog, number of comments to postings in a blog, time since the last posting or comment was made in a blog, number of times a blog has been read, and others.

A given blog may be a member of more than one social network community. Thus blog 1 is shown having inner region representations in sub-regions 62, 66, and 70 in the example of FIG. 3. A blog for which there are no social network relationships with other blogs may be presented in a very small inner region outside the sub-regions representing social network communities, or not represented at all.

The inner regions of FIG. 3 may be labeled in a manner appropriate to identify the blog they represent. For example, inner region 74 may have a user readable label identifying blog 1, such as a blog name associated with blog1. Each other inner region may similarly have a label identifying the blog it represents. Sub-regions may also be given visual attributes to make them distinct from each other, such as shadings, colors, super-imposed labels, or the like.

Figure 4:
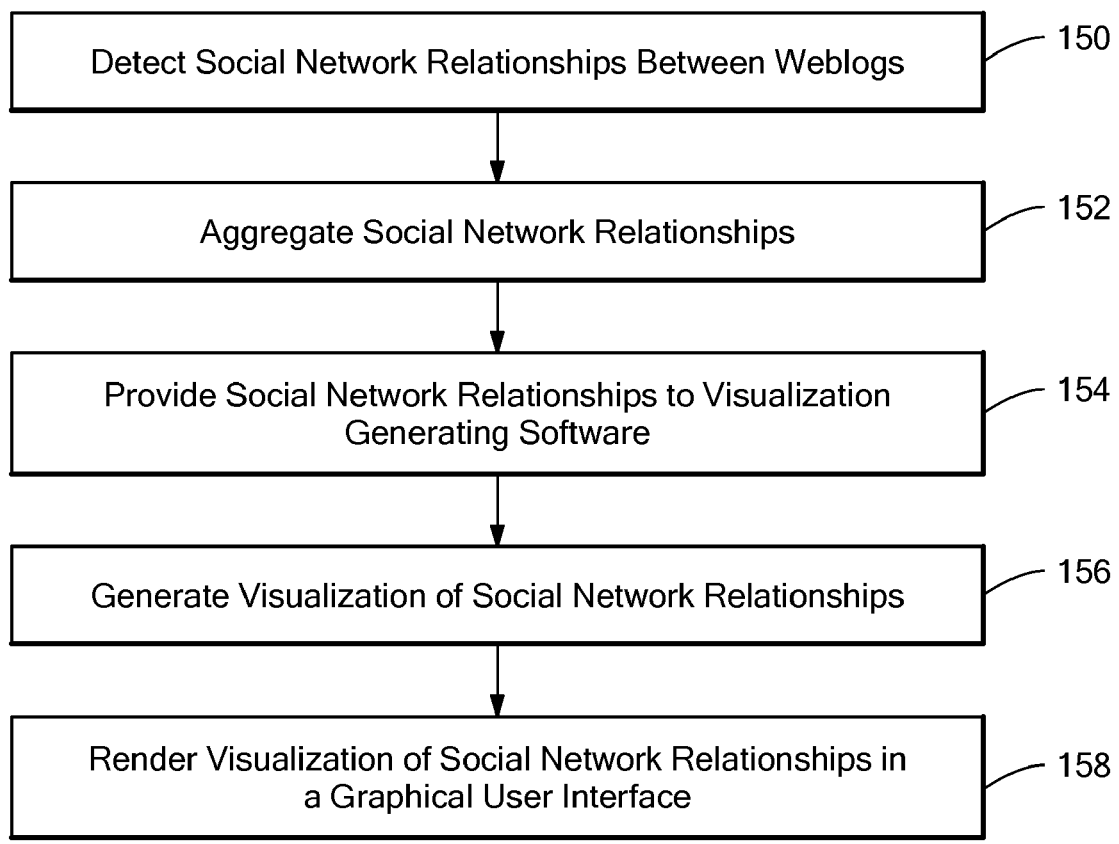
FIG. 4 is a flow chart illustrating steps performed by an illustrative embodiment of the disclosed system.

FIG. 4 is a flow chart illustrating steps performed by an illustrative embodiment of the disclosed system. As shown in FIG. 4, at step 150 the disclosed system detects social network relationships between Weblogs, and at step 152 these detected social network relationships are aggregated across a set of Weblogs. At step 154 the aggregated social network relationships are provided to or made available to visualization generating software, which operates at step 156 to generate a treemap representation of the social network communities within the set of Weblogs, such as the representation shown in FIG. 3. The social network community representation is then rendered to a user through a graphical user interface at step 158.

FIGS. 2 and 4 are block diagram and flowchart illustrations of methods, apparatus(s) and computer program products according to an embodiment of the invention. It will be understood that each block of FIGS. 2 and 4, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

I claim:

1. A method of representing a set of on-line journals, comprising:
    detecting social network relationships among said on-line journals;
    aggregating said social network relationships; and
    generating a graphical user interface display representing said on-line journals, wherein said display includes an enclosing display object within which are displayed at least one sub-region, said sub-region enclosing a plurality of inner regions, wherein each inner region within a given sub-region represents an on-line journal having at least one social network relationship with at least one other on-line journal represented by another inner region displayed within said sub-region, wherein a relative size of each of said inner regions reflects the number of said social network relationships including an on-line journal represented by said inner region and at least one other on-line journal represented by another inner region displayed within the same sub-region.

2. The method of claim 1, wherein said enclosing display object, said at least one sub-region, and said plurality of inner regions comprise rectangular display objects.

3. The method of claim 1 wherein each of said on-line journals is associated with at least one author.

4. The method of claim 1, wherein each of said on-line journals includes a user-readable list of links to other ones of said on-line journals.

5. The method of claim 4, wherein said social network relationships comprise at least one entry in said list of links to other ones of said on-line journals for a first one of said on-line journals, wherein said entry includes a link to a second one of said on-line journals.

6. A system having a computer readable storage medium, said computer readable medium having a computer program for representing a set of on-line journals stored thereon, said computer program comprising:
  program code for detecting social network relationships among said on-line journals;
  program code for aggregating said social network relationships; and
  program code for generating a graphical user interface display representing said on-line journals, wherein said display includes an enclosing display object within which are displayed at least one sub-region, said sub-region enclosing a plurality of inner regions, wherein each inner region within a given sub-region represents an on-line journal having at least one social network relationship with at least one other on-line journal represented by another inner region displayed within said sub-region, wherein a relative size of each of said inner regions reflects the number of said social network relationships including an on-line journal represented by said inner region and at least one other on-line journal represented by another inner region displayed within the same sub-region.

7. The system of claim 6, wherein said enclosing display object, said at least one sub-region, and said plurality of inner regions comprise rectangular display objects.

8. The system of claim 6 wherein each of said on-line journals is associated with at least one author.

9. The system of claim 6, wherein each of said on-line journals includes a user-readable list of links to other ones of said on-line journals.

10. The system of claim 9, wherein said social network relationships comprise at least one entry in said list of links to other ones of said on-line journals for a first one of said on-line journals, wherein said entry includes a link to a second one of said on-line journals.

11. A computer program product having a computer readable storage medium, said computer readable medium having a computer program for representing a set of on-line journals stored thereon, said computer program comprising:
  program code for detecting social network relationships among said on-line journals;
  program code for aggregating said social network relationships; and
  program code for generating a graphical user interface display representing said on-line journals, wherein said display includes an enclosing display object within which are displayed at least one sub-region, said sub-region enclosing a plurality of inner regions, wherein each inner region within a given sub-region represents an on-line journal having at least one social network relationship with at least one other on-line journal represented by another inner region displayed within said sub-region, wherein a relative size of each of said inner regions reflects the number of said social network relationships including an on-line journal represented by said inner region and at least one other on-line journal represented by another inner region displayed within the same sub-region.

12. A system for representing a set of on-line journals, comprising:
  a display device;
  means for detecting social network relationships among said on-line journals;
  means for aggregating said social network relationships; and
  means for generating a graphical user interface display representing said on-line journals, wherein said graphical user interface display includes an enclosing display object within which are displayed at least one sub-region, said sub-region enclosing a plurality of inner regions, wherein each inner region within a given sub-region represents an on-line journal having at least one social network relationship with at least one other on-line journal represented by another inner region displayed within said sub-region, wherein a relative size of each of said inner regions reflects the number of said social network relationships including an on-line journal represented by said inner region and at least one other on-line journal represented by another inner region displayed within the same sub-region.

* * * * *